United States Patent
Orita

(10) Patent No.: US 9,091,306 B2
(45) Date of Patent: Jul. 28, 2015

(54) POWER TRANSMISSION DEVICE

(71) Applicant: HONDA MOTOR CO., LTD., Tokyo (JP)

(72) Inventor: Atsuo Orita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 13/778,829

(22) Filed: Feb. 27, 2013

(65) Prior Publication Data

US 2013/0270053 A1   Oct. 17, 2013

(30) Foreign Application Priority Data

Apr. 13, 2012  (JP) ................................. 2012-092487

(51) Int. Cl.
| F16D 48/06 | (2006.01) |
| --- | --- |
| F16D 28/00 | (2006.01) |
| F16D 27/02 | (2006.01) |
| F16D 37/00 | (2006.01) |
| B25J 19/06 | (2006.01) |

(52) U.S. Cl.
CPC ............. *F16D 28/00* (2013.01); *B25J 19/068* (2013.01); *F16D 27/02* (2013.01); *F16D 37/008* (2013.01)

(58) Field of Classification Search
CPC ....... F16D 37/008; F16D 27/02; B25J 19/008
USPC ....................... 192/55.4, 208, 58.4
See application file for complete search history.

(56) References Cited

U.S. PATENT DOCUMENTS

| 5,650,704 | A | 7/1997 | Pratt et al. | |
| --- | --- | --- | --- | --- |
| 6,149,166 | A * | 11/2000 | Struss et al. | 280/5.511 |
| 6,668,995 | B2 * | 12/2003 | Janson et al. | 192/55.4 |
| 6,811,166 | B2 * | 11/2004 | Carlstedt et al. | 280/124.152 |
| 6,923,299 | B2 * | 8/2005 | Barbison et al. | 188/267.1 |
| 7,401,834 | B2 * | 7/2008 | Browne et al. | 296/68.1 |
| 7,797,933 | B2 * | 9/2010 | Mankame et al. | 60/329 |
| 2003/0213672 | A1 * | 11/2003 | Janson et al. | 192/201 |
| 2008/0141736 | A1 * | 6/2008 | Jones et al. | 70/77 |

FOREIGN PATENT DOCUMENTS

| DE | 40 08 538 A1 | 9/1990 |
| --- | --- | --- |
| DE | 195 21 060 A1 | 12/1996 |
| EP | 0 974 477 B1 | 9/2005 |
| JP | 2005-155871 | 6/2005 |

OTHER PUBLICATIONS

German Office Action dated Mar. 17, 2014 (English translation included).

German Search Report dated Mar. 17, 2014 (English translation included).

* cited by examiner

*Primary Examiner* — Rodney H Bonck
*Assistant Examiner* — Lillian Nguyen
(74) *Attorney, Agent, or Firm* — Rankin, Hill & Clark LLP

(57) ABSTRACT

A power transmission device 1 includes a variable stiffness unit 41, which has variable stiffness, receives a torque from a motor A2, and transmits the torque to an output unit B, a variable viscosity coefficient unit 42, which has variable viscosity, receives the torque from the motor A2, and transmits the torque to the output unit B, and a controller A4 which modifies the stiffness of the variable stiffness unit 41 and the viscosity of the variable viscosity coefficient unit 42.

8 Claims, 10 Drawing Sheets

FIG.5 A
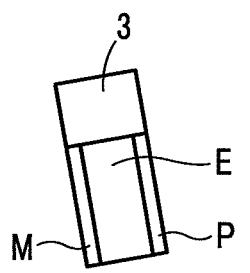
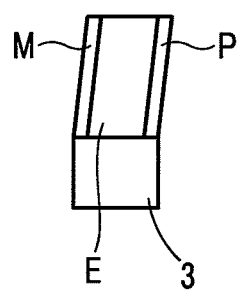
FIG.5 B
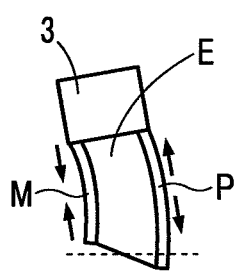
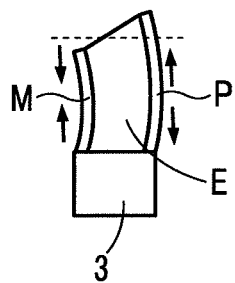

POWER TRANSMISSION DEVICE

BACKGROUND OF THE INVENTION

1. Field of the Invention

The present invention relates to a power transmission device which transmits motive power transmitted from a driving element to a driven element.

2. Description of the Related Art

In recent years, as in the case where a robot comes in contact with an obstacle, it is desired that a joint disposed between links of the robot is flexible as a power transmission element in order to prevent the robot from being damaged even in the case where an impact is applied to the robot.

In view of the above circumstances, there is known an actuator with an elastic member disposed between a driving element and a driven element of a robot (U.S. Pat. No. 5,650, 704). This actuator prevents an impact from being directly transmitted to the driven element or the driving element by the elasticity of the elastic member even in the case where the impact occurs in the driving element or the driven element. In the case where a joint has flexibility in this manner, a controlled object (for example, the motion of a joint or the like) oscillates more easily by improving a control response. Therefore, the oscillation of the controlled object is suppressed by a feedback control on the basis of information detected by various sensors or the like.

In the case where various sensors or the like are placed in an abnormal state, however, an appropriate feedback control might not be able to be performed and by extension the oscillation might not be able to be suppressed appropriately. Accordingly, it is conceivable to suppress the oscillation by giving viscosity to the joint even in the case where it is impossible to suppress the oscillation by the feedback control.

Meanwhile, in such a case where a precise operation is required, it is preferable that a joint is stiff in some cases. Specifically, if the stiffness of a joint is able to be varied, appropriate control can be performed in various situations. In order to satisfy this requirement, it is conceivable to use a member whose stiffness is variable such as a nonlinear spring as an elastic member.

Generally, however, the following relational expression is already known in a spring-damper system:

[MATH 1]

$$h \cdot \omega = \frac{c}{2m} \quad (1)$$
$$h \cdot \sqrt{\frac{k}{m}} = \frac{c}{2m}$$

where h is a damping constant, ω is an angular frequency, k is an elastic coefficient, m is the mass of a load, and C is a viscosity coefficient.

According to the expression (1), supposing that the mass m of a load and the viscosity coefficient C are constant, the damping constant h varies if the elastic coefficient (stiffness) k representing the elasticity of the elastic member is varied. The damping constant h represents a damping rate of vibration in a process in which a vibrating load converges.

The control processing is performed for each previously-determined period. Therefore, the control processing is able to be easily performed if the vibration of a load in a control period at the present time is able to be predicted from the vibration of the load in the previous control period. In other words, the control processing is able to be easily performed when the damping rate (and by extension the damping constant h) is constant than when it is variable. Accordingly, when the damping constant h is constant in the expression (1), the mass m of the load is constant, and therefore it is necessary to vary the viscosity coefficient C according to a change in stiffness k.

In the case where a joint has viscosity as well as elasticity as described above, it is desirable to vary the viscosity coefficient C as well as the stiffness k. Additionally, there is no problem even if the value of the damping constant h fluctuates as long as within the range where the control is able to be easily performed.

SUMMARY OF THE INVENTION

It is an object of the present invention to provide a power transmission device capable of effectively suppressing the oscillation of a controlled object in the case where a power transmission element such as the aforementioned joint has a variable stiffness and also has viscosity.

According to an aspect of the present invention, there is provided a power transmission device which transmits motive power transmitted from a driving element to a driven element, including: a first element having variable stiffness and configured to receive the motive power from the driving element and to transmit the motive power to the driven element; a second element having variable viscosity and configured to receive the motive power from the driving element and to transmit the motive power to the driven element; a first modification unit configured to modify the stiffness of the first element; and a second modification unit configured to modify the viscosity of the second element (First aspect of the invention).

According to the first aspect of the invention, the motive power of the driving element is transmitted to the driven element via the first element and the second element. Specifically, the second element having viscosity as a power transmission element is provided on a power transmission path between the driving element and the driven element, thereby enabling the vibration of the driven element to be mechanically converged at the time of the control of the driven element. Moreover, the first element has stiffness able to be modified by the first modification unit and therefore the driven element is able to be flexibly controlled according to the situation.

Moreover, the second element has viscosity able to be modified by the second modification unit and therefore, for example, in the case where the first modification unit modifies the stiffness, the second modification unit is able to modify the viscosity of the second element according to the modified stiffness. Thereby, even in the case where the stiffness of the first element is modified according to the situation, the modification of the viscosity of the second element enables the prevention of, for example, a remarkable change in the damping rate of the vibration of the driven element.

Accordingly, in the execution of control processing, the vibration of a load in the control period at the present time is easily predicted from the vibration of the load in the previous control period, thereby facilitating the control processing. In this manner, the oscillation of the controlled object can be effectively suppressed by using the power transmission element whose stiffness and viscosity are able to be modified by appropriately modifying the stiffness and viscosity.

In the first aspect of the invention, preferably the second modification unit modifies the viscosity according to the stiffness modified by the first modification unit so that damping of vibration of the driven element is predetermined damping (Second aspect of the invention). Thereby, the viscosity of the second element is modified according to the stiffness of the first element modified by the first modification unit so that the damping of the vibration of the driven element is predetermined damping. This enables the damping of the driven element to be predicted in advance in each control period, thereby facilitating the control processing and suppressing the oscillation more effectively.

In the first aspect of the invention, preferably the power transmission device is configured to be able to switch between a transmission state in which the motive power is transmitted to the driven element and a non-transmission state in which the transmission is disconnected by modifying the stiffness of the first element or the viscosity of the second element (Third aspect of the invention). Thus, the modification of the stiffness or viscosity causes a switch to the non-transmission state in which the motive power is not transmitted to the driven element, thereby preventing the driven element from being mechanically driven. Moreover, the second element has viscosity and therefore only a switch to the non-transmission state enables the oscillation of the driven element to be mechanically suppressed without any other control for suppressing the oscillation.

In the third aspect of the invention, preferably the power transmission device further includes: a drive source which transmits motive power to the driving element; and a control unit which controls the drive source and is configured to perform the control to modify the stiffness of the first element and the viscosity of the second element, wherein the control unit includes: a first determination unit configured to determine whether the drive source is able to be normally controlled; and a second determination unit configured to determine whether the transmission state is set, wherein: the control unit performs a control to achieve the non-transmission state in the case where the determination result of the first determination unit is negative; the control unit controls the drive source so that a difference between a displacement of the driven element and a displacement of the driving element is equal to or less than a predetermined value in the case where the determination result of the first determination unit is affirmative and the determination result of the second determination unit is negative; and the control unit controls the motive power transmitted to the driven element in the case where the determination result of the first determination unit is affirmative and the determination result of the second determination unit is affirmative (Fourth aspect of the invention).

Thereby, the non-transmission state is set in the case where the first determination unit determines that the drive source is not able to be normally controlled. This causes a state where motive power is not transmitted to the driven element. If this state occurs, the second element has viscosity and therefore, even in the case where the drive source is not controlled, the oscillation of the driven element is able to be suppressed and converged.

Moreover, generally at the time of transition from the non-transmission state to the transmission state, the transmission state needs to be set within the range of a previously-defined difference in a relative displacement between the driven element and the driving element. Therefore, it is necessary to set the transmission state after bringing the difference between the displacement of the driven element and the displacement of the driving element close to the defined difference. Accordingly, if the difference in the relative displacement between the driven element and the driving element is greater than the defined difference when the control unit or the like determines to set the transmission state, it is necessary to bring the difference in the relative displacement to a level equal to or less than the defined difference before setting the transmission state.

In the present invention, however, in the case where the control unit is able to control the drive source normally and the non-transmission state is set, the driving element is controlled so that the difference between the displacement of the driven element and the displacement of the driving element is equal to or less than the predetermined value. Therefore, immediately after the control unit or the like determines to set the transmission state, the transmission state is able to be set. Consequently, the time for control processing is able to be reduced.

Furthermore, in the case where the first determination unit determines that the drive source is able to be normally controlled and the second determination unit determines that the transmission state is set, the motive power transmitted to the driven element is controlled. This enables the control of the operation of the driven element.

In the first aspect of the invention, preferably the first element and the second element each include a conductive polymer actuator and the first modification unit and the second modification unit are each configured as a voltage application unit which applies a voltage to the conductive polymer actuator (Fifth aspect of the invention). The stiffness and viscosity of the conductive polymer actuator are able to be modified by applying a voltage to the conductive polymer actuator. Therefore, the use of the conductive polymer actuator simplifies the structure of the power transmission device in comparison with the case of preparing "a system which modifies the stiffness" and "a system which modifies the viscosity" separately.

In the third aspect of the invention, preferably the first element and the second element each include a conductive polymer actuator formed in a tubular shape; the first modification unit and the second modification unit are each configured as a voltage application unit which applies a voltage to the conductive polymer actuator; the driven element is at least partially disposed in a hollow portion of the conductive polymer actuator; and the conductive polymer actuator is configured in such a way that the space of the hollow portion decreases in response to the application of the voltage from the voltage application unit and that the inner wall surface of the hollow portion comes in contact with the driven element in the case where the applied voltage is equal to or greater than a predetermined voltage (Sixth aspect of the invention).

Thereby, the stiffness and viscosity of the conductive polymer actuator vary by applying the voltage to the conductive polymer actuator. Therefore, the use of the conductive polymer actuator simplifies the structure of the power transmission device in comparison with the case of preparing "a system which modifies the stiffness" and "a system which modifies the viscosity" separately.

Furthermore, the conductive polymer actuator is configured in such a way that the space of the tubular hollow portion decreases (for example, decreases in a radial direction or the like) in response to the application of the voltage. In the case where the voltage applied to the conductive polymer actuator is equal to or greater than the predetermined voltage, the inner wall surface of the hollow portion comes in contact with the driven element. Thereby, the motive power transmitted to the conductive polymer actuator is transmitted to the driven element (the transmission state in which the motive power is transmitted from the driving element to the driven element is set).

In other words, it is possible to switch between the transmission state and the non-transmission state by selecting whether or not to set the voltage applied to the conductive polymer actuator to a value equal to or greater than the predetermined voltage. In the case where the inner wall of the hollow portion of the conductive polymer actuator is assumed to be an input-side clutch plate and the region of the driven element which comes in contact with the inner wall is assumed to be an output-side clutch plate, it is possible to assume that a clutch system is achieved by using the conductive polymer actuator and the driven element.

As described hereinabove, the control unit is able to modify the stiffness and the viscosity and to control the transmission state and the non-transmission state only by controlling the voltage applied to the conductive polymer actuator.

In the third aspect of the invention, preferably the first element and the second element each include a conductive polymer actuator formed in a tubular or pillar shape; the first modification unit and the second modification unit are each configured as a voltage application unit which applies a voltage to the conductive polymer actuator; a convex portion is provided on the outer wall of the conductive polymer actuator; and the conductive polymer actuator is configured so as to contract in the longitudinal direction of the conductive polymer actuator in response to the application of the voltage from the voltage application unit and in such a way that the convex portion comes in contact with the driven element in the case where the applied voltage is equal to or greater than a predetermined voltage (Seventh aspect of the invention).

Thereby, similarly to the sixth aspect of the invention, the stiffness and viscosity of the conductive polymer actuator vary in response to the application of the voltage, thereby achieving a simple structure of the power transmission device.

Furthermore, the conductive polymer actuator is configured so as to contract in the longitudinal direction of the tubular or pillar shape in response to the application of the voltage. In the case where the voltage applied to the conductive polymer actuator is equal to or greater than the predetermined voltage, the convex portion comes in contact with the driven element by moving in the longitudinal direction. Thereby, the motive power transmitted to the conductive polymer actuator is transmitted to the driven element (the transmission state in which the motive power is transmitted from the driving element to the driven element is set).

In other words, it is possible to switch between the transmission state and the non-transmission state by selecting whether or not to set the voltage applied to the conductive polymer actuator to a value equal to or greater than the predetermined voltage. In the case where the convex portion of the conductive polymer actuator is assumed to be an input-side clutch plate and the region of the driven element which comes in contact with the convex portion is assumed to be an output-side clutch plate, it is possible to assume that a clutch system is achieved by using the convex portion and the driven element.

As described hereinabove, the control unit is able to modify the stiffness and the viscosity and to control the transmission state and the non-transmission state only by controlling the voltage applied to the conductive polymer actuator.

In the third aspect of the invention, preferably the first element and the second element each include a conductive polymer actuator formed in a tubular or pillar shape; the first modification unit and the second modification unit are each configured as a voltage application unit which applies a voltage to the conductive polymer actuator; the driven element is connected to one end of the conductive polymer actuator; and the conductive polymer actuator is configured so as to contract in the longitudinal direction of the conductive polymer actuator in response to the application of a voltage from the voltage application unit and in such a way that the driven element comes in contact with the driving element in the case where the applied voltage is equal to or greater than a predetermined voltage (Eighth aspect of the invention).

Thereby, similarly to the sixth and seventh aspects of the invention, the stiffness and viscosity of the conductive polymer actuator vary in response to the application of the voltage, thereby achieving a simple structure of the power transmission device.

Furthermore, the conductive polymer actuator is configured so as to contract in the longitudinal direction of the tubular or pillar shape in response to the application of the voltage. In the case where the voltage applied to the conductive polymer actuator is equal to or greater than the predetermined voltage, the driven element comes in contact with the driving element by moving in the longitudinal direction of the conductive polymer actuator formed in the tubular or pillar shape. Thereby, the motive power transmitted to the conductive polymer actuator is transmitted to the driven element (the transmission state in which the motive power is transmitted from the driving element to the driven element is set).

In other words, it is possible to switch between the transmission state and the non-transmission state by selecting whether or not to set the voltage applied to the conductive polymer actuator to a value equal to or greater than the predetermined voltage. In the case where the region of the driven element which comes in contact with the driving element is assumed to be an output-side clutch plate and the region of the driving element which comes in contact with the driven element is assumed to be an input-side clutch plate, it is possible to assume that a clutch system is achieved by using the region of the driving element and the region of the driven element in contact with each other.

As described hereinabove, the control unit is able to modify the stiffness and the viscosity and to control the transmission state and the non-transmission state only by controlling the voltage applied to the conductive polymer actuator.

In the first aspect of the invention, preferably the first modification unit includes a first actuator, the first element is configured as a variable stiffness unit which varies in stiffness in a direction perpendicular to the driving direction by being at least partially pressed in response to driving of the first actuator, the second modification unit includes a second actuator, and the second element is configured as a variable viscosity coefficient unit which varies in viscosity in a direction perpendicular to the driving direction by being at least partially pressed in response to driving of the second actuator (Ninth aspect of the invention). Thus, the first actuator is able to vary the stiffness of the first element and the second actuator is able to vary the viscosity of the second element, thereby enabling the oscillation of the controlled object to be effectively suppressed.

In the ninth aspect of the invention, preferably the first actuator and the second actuator are piezoelectric elements each formed in a tubular or pillar shape, the first element is a nonlinear spring, the second element includes a third element in which a convex portion is provided and a fourth element in which a concave portion along the shape of the convex portion is provided and filled with a viscous liquid, motive power is transmitted from the driving element to one of the third element and the fourth element, motive power is transmitted from the other of the third element and the fourth element to the driven element, and the second element is configured so that driving of the piezoelectric element increases an area in which the convex portion comes in contact with the viscous liquid (Tenth aspect of the invention). Thus, the nonlinear spring is moved by driving the piezoelectric element, thereby enabling the stiffness of the nonlinear spring to be modified. Moreover, the third element is moved by driving the piezoelectric element, thereby bringing the convex portion close to the bottom of the concave portion so as to increase the contact area between the convex portion and the viscous liquid. This enables an increase in the viscosity coefficient of the convex portion and the viscous liquid. The stiffness and the viscosity are able to be modified by driving the piezoelectric elements in this manner, thereby enabling the oscillation of the controlled object to be effectively suppressed.

BRIEF DESCRIPTION OF THE DRAWINGS

FIGS. 5A and 5B are diagrams illustrating the details of an intermediate member of the power transmission device of the first embodiment;

DESCRIPTION OF THE PREFERRED EMBODIMENTS

Figure 1:
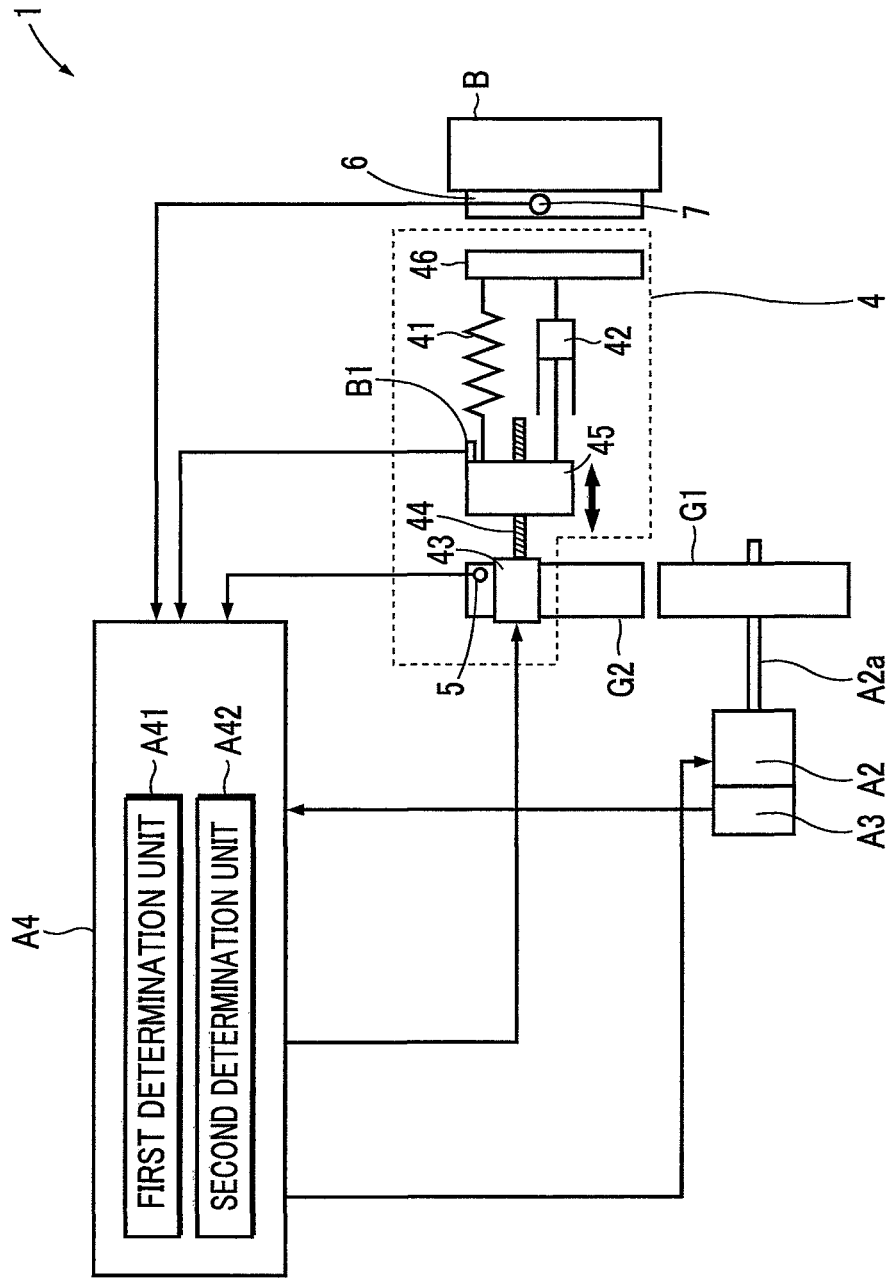
FIG. 1 is a conceptual diagram of a power transmission device of an exemplary embodiment according to the present invention.

FIG. 1 is a conceptual diagram of a power transmission device 1 of the exemplary embodiment. As illustrated in FIG. 1, the power transmission device 1 mainly includes a motor A2, an input gear G2, an intermediate member 4, a driven-side clutch plate 6, a controller A4, and an output unit B.

The motor A2 is a so-called electric motor, which generates a torque which rotates a motor output shaft A2a connected to the motor A2 about the axis of the motor output shaft A2a by being supplied with electric power from a power supply which is not illustrated. Moreover, the motor A2 is connected to a motor encoder A3 which detects a rotation angle of the motor A2. A drive gear G1 is fixed to the motor output shaft A2a. The drive gear G1 rotates along with the motor output shaft A2a.

The input gear G2 is configured to engage with the drive gear G1, and the input gear G2 rotates by the rotation of the drive gear G1. At this time, the input gear G2 rotates while reducing the speed of the rotation of the motor A2. In other words, the drive gear G1 and the input gear G2 function as speed reducers.

Moreover, the input gear G2 is provided with an input-side torque sensor (for example, a strain gauge or the like) 5 disposed therein, which detects a torque output from the input gear G2.

The intermediate member 4 includes a variable stiffness unit 41, a variable viscosity coefficient unit 42, a characteristic modification unit 43, a threaded shaft 44, a nut 45, and a drive-side clutch plate 46. In this condition, the variable stiffness unit 41 is a nonlinear spring whose stiffness varies according to a displacement. Moreover, the variable viscosity coefficient unit 42 is a nonlinear damper whose viscosity coefficient varies according to a displacement.

Furthermore, the characteristic modification unit 43 is a drive source which rotates the threaded shaft 44 according to an applied voltage (hereinafter, referred to as "characteristic modification voltage"). The characteristic modification unit 43 is supplied with electric power from a power supply (not illustrated) for use in driving the characteristic modification unit 43. The nut 45 moves in the horizontal direction of FIG. 1 along the axial direction of the threaded shaft 44 by the rotation of the threaded shaft 44 which is caused by driving the characteristic modification unit 43.

At this time, the characteristic modification unit 43 moves the nut 45 in the rightward direction if the characteristic modification voltage increases, moves the nut 45 in the leftward direction if the characteristic modification voltage decreases, and stops the movement of the nut 45 if the characteristic modification voltage is constant. Unless the characteristic modification voltage is applied to the characteristic modification unit 43, the characteristic modification unit 43 moves the nut 45 to the leftmost side.

Moreover, the nut 45 moves in the rightward direction of FIG. 1, thereby pressing the variable stiffness unit 41 and the variable viscosity coefficient unit 42, by which the variable stiffness unit 41 and the variable viscosity coefficient unit 42 are displaced in the rightward direction of FIG. 1 by a distance by which the nut 45 moves in the rightward direction. Further, the nut 45 moves in the leftward direction of FIG. 1, thereby releasing the rightward pressing force and the variable stiffness unit 41 and the variable viscosity coefficient unit 42 are displaced in the leftward direction of FIG. 1 by a distance by which the nut 45 moves in the leftward direction. The above movement of the nut 45 varies the stiffness of the variable stiffness unit 41 and the viscosity coefficient of the variable viscosity coefficient unit 42. In other words, the stiffness of the variable stiffness unit 41 and the viscosity coefficient of the variable viscosity coefficient unit 42 vary according to the characteristic modification voltage.

Figure 2:
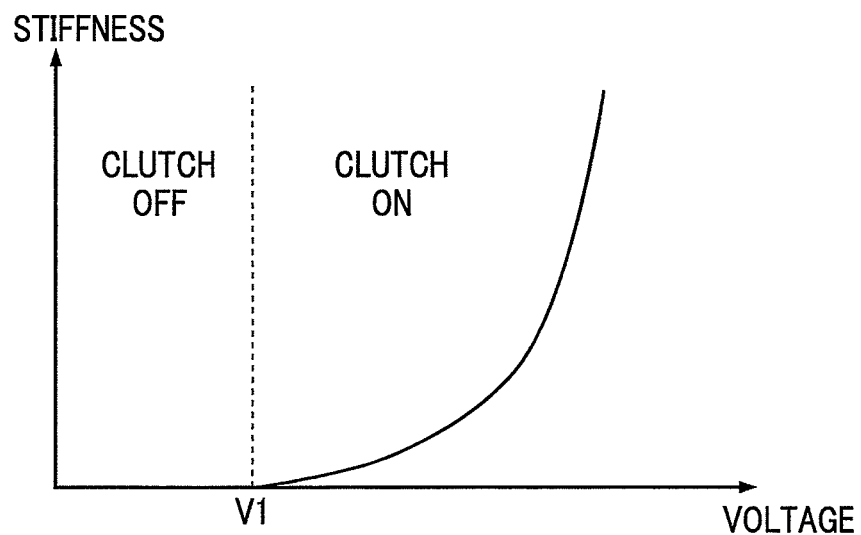
FIG. 2A is a diagram illustrating the voltage characteristic of a variable stiffness unit of the power transmission device of the exemplary embodiment and FIG. 2B is a diagram illustrating the voltage characteristic of a variable viscosity coefficient unit.
Figure 2:
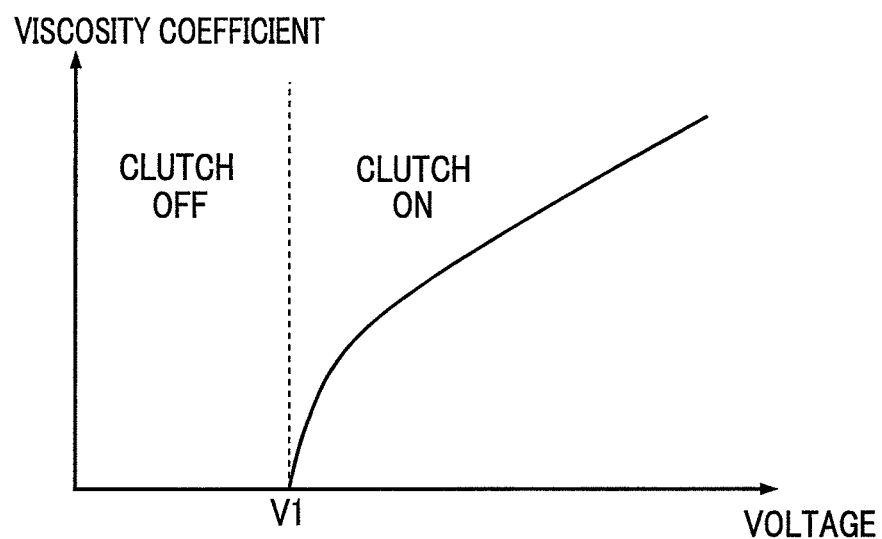

FIG. 2A illustrates the voltage characteristic of the variable stiffness unit 41 with the horizontal axis representing the voltage and the vertical axis representing the stiffness. As illustrated in FIG. 2A, the variable stiffness unit 41 has a characteristic that the stiffness of the variable stiffness unit 41 increases with an increase in a voltage applied to the characteristic modification unit 43 of the intermediate member 4. In this situation, the voltage-stiffness characteristic curve has a slope steepened with an increase in the voltage.

FIG. 2B illustrates the voltage characteristic of the variable viscosity coefficient unit 42 with the horizontal axis representing the voltage and the vertical axis representing the viscosity coefficient. As illustrated in FIG. 2B, the variable viscosity coefficient unit 42 has a characteristic that the viscosity coefficient of the variable viscosity coefficient unit 42 increases with an increase in a voltage applied to the characteristic modification unit 43 of the intermediate member 4. In this situation, the voltage-viscosity-coefficient characteristic curve has a slope getting smaller with an increase in the voltage up to a predetermined voltage and maintained constant at the predetermined voltage and higher voltages. In FIGS. 2A and 2B, the stiffness and the viscosity coefficient do not increase at a certain voltage and higher voltages.

As described by using the aforementioned expression (1), the voltage characteristics of the stiffness and the viscosity coefficient are decided so that the damping rate of vibration on the driven side (for example, the output unit B) is constant (note, however, that the damping rate is not strictly constant, but constant at a certain minimum desired or required level for enabling the control processing to be easily performed as described above). Specifically, the characteristics of the stiffness and the viscosity coefficient are decided so that the damping rate is constant for the respective voltage values.

In addition, the controller A4 decides the voltage value corresponding to a desired stiffness when acquiring the desired stiffness on the basis of the characteristic as illustrated in FIG. 2A. The characteristics illustrated in FIGS. 2A and 2B are previously decided according to an experiment or the like (decided at the stage of forming the variable stiffness unit 41 and the variable viscosity coefficient unit 42), and therefore the controller A4 only needs to decide the voltage value so as to obtain the desired stiffness, which enables the viscosity coefficient of the variable viscosity coefficient unit 42 to be modified to a value that makes the damping rate constant.

Here, "to modify the stiffness and the viscosity coefficient according to the characteristics previously determined so that the damping rate is constant" as described above corresponds to "the second modification unit modifies the viscosity according to the stiffness modified by the first modification unit so that damping of vibration of the driven element is predetermined damping" in the present invention.

Here, although FIG. 1 illustrates the power transmission device as if the variable stiffness unit 41 applied a force according to the "stiffness" and the "displacement" in the horizontal direction of FIG. 1 and the variable viscosity coefficient unit 42 applied a force according to the "viscosity coefficient" and the "speed" in the horizontal direction of FIG. 1, actually each of the variable stiffness unit 41 and the variable viscosity coefficient unit 42 applies the force according to the rotational direction of the drive-side clutch plate 46 (or the driven-side clutch plate 6). The reason why the power transmission device is illustrated as in FIG. 1 is because the illustration is complicated if the illustration is made in such a way that the force is applied according to the rotational direction of the drive-side clutch plate 46, which makes the illustration to be hard to understand. In this manner, FIG. 1 is a diagram illustrating the concept of the power transmission device 1 of the exemplary embodiment in a simplified manner.

The drive-side clutch plate 46 is connected to the variable stiffness unit 41 and the variable viscosity coefficient unit 42. Thereby, the drive-side clutch plate 46 rotates about the central axis common to the input gear G2 when the input gear G2 rotates since a torque output from the input gear G2 is transmitted via the variable stiffness unit 41 and the variable viscosity coefficient unit 42. Therefore, the output torque of the input gear G2 is transmitted to the drive-side clutch plate 46 according to the stiffness of the variable stiffness unit 41 and the viscosity coefficient of the variable viscosity coefficient unit 42.

Additionally, a displacement encoder B1 is fixed to the nut 45. The displacement encoder B1 is a distance sensor which detects a distance between the nut 45 and the drive-side clutch plate 46. Specifically, it is possible to detect where the nut 45 is located on the basis of an output from the displacement encoder B1. Furthermore, it is possible to detect (or estimate) the stiffness of the variable stiffness unit 41 and the viscosity coefficient of the variable viscosity coefficient unit 42 according to the position of the nut 45.

If the characteristic modification voltage is less than a predetermined voltage V1, the drive-side clutch plate 46 and the driven-side clutch plate 6 are not in contact with each other (specifically, the clutches are not connected to each other: hereinafter, this state is referred to as "non-transmission state"). If the characteristic modification voltage is equal to or greater than the predetermined voltage V1, the drive-side clutch plate 46 and the driven-side clutch plate 6 are in contact with each other (specifically, the clutches are connected to each other: hereinafter, this state is referred to as "transmission state"). Hereinafter, when both of the drive-side clutch plate 46 and the driven-side clutch plate 6 are specified, terms "clutches 6 and 46" may be used in some cases.

A surface where the drive-side clutch plate 46 and the driven-side clutch plate 6 come in contact with each other is formed so as to generate a great frictional force. Accordingly, when the drive-side clutch plate 46 and the driven-side clutch plate 6 are in contact with each other, the torque generated at the time of rotation of the drive-side clutch plate 46 is transmitted to the driven-side clutch plate 6, by which the driven-side clutch plate 6 rotates about the central axis common to the drive-side clutch plate 46.

Additionally, the driven-side clutch plate 6 is provided with an output-side torque sensor (for example, a strain gauge or the like) 7 disposed therein, which detects the torque transmitted to the driven-side clutch plate 6.

Moreover, the output unit B, which is connected to a load, is connected to the driven-side clutch plate 6. As the load, various loads may be used according to the uses or the like of the power transmission device 1. For example, if the power transmission device 1 is an arm composed of two links for use in lifting up various objects and the intermediate member 4 is a joint disposed between the links, the output unit B is a link on the driven side and the load is an object lifted up by the link.

Since the power transmission device 1 is configured as described above, the clutches 6 and 46 are placed in the transmission state when a characteristic modification voltage equal to or greater than the predetermined voltage V1 is applied to the characteristic modification unit 43 of the intermediate member 4. Therefore, the torque output from the motor A2 is transmitted to the driven-side clutch plate 6 and by extension to the output unit B via the intermediate member 4. On the other hand, if the voltage applied to the characteristic modification unit 43 of the intermediate member 4 is zero or the applied characteristic modification voltage is less than the predetermined voltage V1, the clutches 6 and 46 are placed in the non-transmission state, and therefore the torque output from the motor A2 is not transmitted to the driven-side clutch plate 6 and by extension to the output unit B.

The above description, "the transmission state and the non-transmission state are able to be switched to each other according to whether the characteristic modification voltage, which modifies the stiffness and the viscosity coefficient, applied to the characteristic modification unit 43 is equal to or greater than the predetermined voltage V1" corresponds to "the power transmission device is configured to be able to switch between a transmission state in which the motive power is transmitted to the driven element and a non-transmission state in which the transmission is disconnected by modifying the stiffness of the first element or the viscosity coefficient of the second element" in the present invention.

In addition, FIGS. 2A and 2B do not illustrate the case where the characteristic modification voltage is less than the predetermined voltage V1 regarding the characteristics of the stiffness and the viscosity coefficient because the clutches 6 and 46 are placed in the non-transmission state at voltages less than the predetermined voltage V1. Specifically, in the non-transmission state, the stiffness and the viscosity coefficient of the intermediate member, which is disposed on the power transmission path between the drive side and the driven side, do not make sense and therefore are not illustrated. Actually, even if the characteristic modification voltage is less than the predetermined voltage V1, the characteristics of the stiffness and the viscosity coefficient are previously defined.

The controller A4 includes "one or a plurality of electronic circuits which perform arithmetic processing of a central processing unit and the like" and "one or a plurality of storage devices composed of a ROM, a RAM, and the like." Moreover, the controller A4 receives outputs from the motor encoder A3, the displacement encoder B1, the input-side torque sensor 5, and the output-side torque sensor 7. The controller A4 controls the motor A2 and the intermediate member 4 (the characteristic modification unit 43 in FIG. 1) on the basis of the received information.

More specifically, the controller A4 supplies the motor A2 with electric current appropriate to a torque command value at the present time (in the present control period) so that the torque output from the motor A2 becomes a target torque. Moreover, the controller A4 applies a voltage appropriate to a stiffness command value (i.e., the characteristic modification voltage) at the present time (in the present control period) to the intermediate member 4 so that the stiffness of the intermediate member 4 becomes a target stiffness.

Moreover, the controller A4 also has functions of a first determination unit A41 which determines whether the motor A2 is able to be normally controlled and a second determination unit A42 which determines whether the transmission state is set.

Here, the variable stiffness unit 41 corresponds to "the first element" in the present invention, the variable viscosity coefficient unit 42 corresponds to "the second element" in the present invention, and the controller A4 corresponds to "the first modification unit," "the second modification unit," "the voltage application unit," and "the control unit" in the present invention. Additionally, the motor A2 corresponds to "the driving element" and "the drive source" in the present invention.

Figure 3:
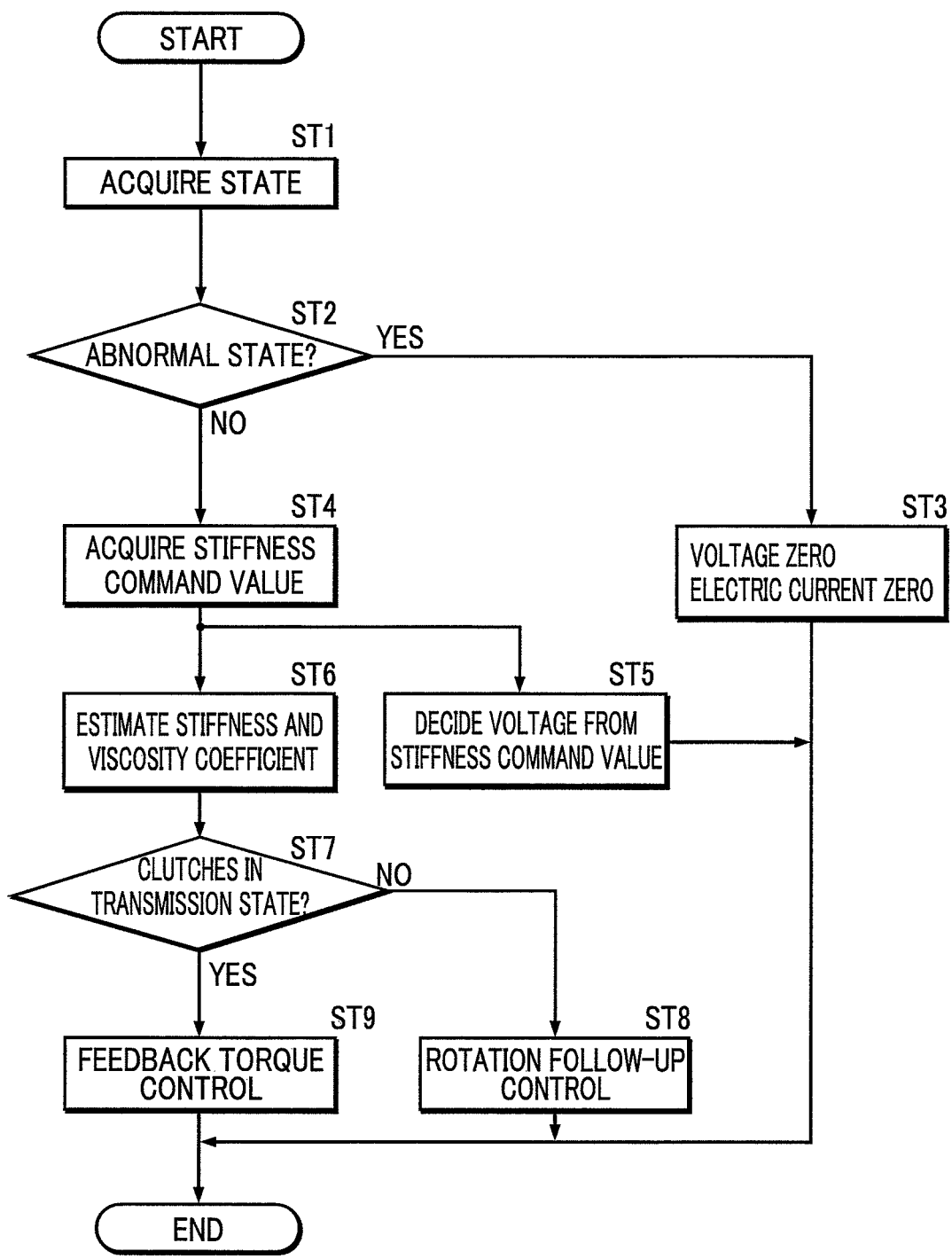
FIG. 3 is a diagram illustrating processing performed by a controller of the power transmission device of the exemplary embodiment.

Subsequently, the control processing performed by the controller A4 will be described with reference to FIG. 3. The controller A4 performs the control processing of FIG. 3 at predetermined intervals (of 10 [ms], for example). The controller A4, first, acquires the state of the power transmission device 1 in the first step ST1. Here, as the state of the power transmission device 1, there are a normal state and an abnormal state. The normal state means a state where all of "sensors and the like such as the motor encoder A3, the displacement encoder B1, the input-side torque sensor 5, and the output-side torque sensor 7" normally operate. The abnormal state means a state where the sensors and the like abnormally operate.

Whether there is abnormality in the sensors and the like is determined according to whether the values detected by the sensors and the like are outside a predetermined range (in other words, whether the values seem to be not detected in the normal operation). Such values are previously decided according to an experiment or the like and are stored in the storage device of the controller A4.

If any one of the sensors and the like has an abnormality and if information acquired by the sensor having the abnormality is able to be estimated from information detected by a normal sensor, the state may be considered to be normal. In this case, an estimated value is used, instead of the output from the sensor having the abnormality.

For example, if the input-side torque sensor 5 has an abnormality, it is possible to estimate a torque output from the input gear G2 from the electric current used when the electric power is supplied to the motor A2. For "the electric current supplied to the motor A2," a value obtained from a current sensor (not illustrated) is used. More specifically, first, "the output torque of the motor A2" is obtained by multiplying "a torque constant (the coefficient of an output torque to the supplied electric current) defined by the motor A2" by "the electric current supplied to the motor A2."

Then, "the torque transmitted to the input gear G2" is obtained by multiplying "the obtained output torque of the motor A2" by "a reduction ratio defined by the drive gear G1 and the input gear G2." Furthermore, "the torque output from the input gear G2" is obtained by subtracting "a frictional force generated when the teeth on the drive gear G1 engage with the teeth on the input gear G2" from "the obtained torque transmitted to the input gear G2."

Moreover, if the output-side torque sensor 7 has an abnormality, it is possible to estimate a torque transmitted to the driven-side clutch plate 6 from respective outputs of the input-side torque sensor 5 and the displacement encoder B1. More specifically, first, a shear stress of the variable viscosity coefficient unit 42 is obtained by multiplying "the viscosity coefficient of the variable viscosity coefficient unit 42" by "a variation per unit time of the output from the displacement encoder B1." Here, the term "a variation per unit time" means a difference between "the output from the displacement encoder B1 in the present control period" and "the output from the displacement encoder B1 in the previous control period."

It is, then, possible to estimate the torque transmitted to the driven-side clutch plate 6 by subtracting the shear stress of the variable viscosity coefficient unit 42 obtained in the above from "the torque output from the input gear G2 and output from the input-side torque sensor 5." If both of the output-side torque sensor 7 and the input-side torque sensor 5 have an abnormality when the torque transmitted to the driven-side clutch plate 6 is estimated, "the torque output from the input gear G2" may be estimated from "the electric current supplied to the motor A2" as described above. In this case, the torque transmitted to the driven-side clutch plate 6 is estimated from "the electric current supplied to the motor A2" and "the output from the displacement encoder B1."

Moreover, as another method of estimating the torque transmitted to the driven-side clutch plate 6, the following method is conceivable. First, the controller A4 calculates "stress accumulated in the variable stiffness unit 41" by multiplying "the stiffness of the variable stiffness unit 41" by "the output from the displacement encoder B1." Then, the controller A4 estimates "the torque transmitted to the driven-side clutch plate 6" by adding "the shear stress of the variable viscosity coefficient unit 42" obtained as described above to "the calculated stress."

The estimation of the torque transmitted to the driven-side clutch plate 6 as described above is performed only in a state where the drive-side clutch plate 46 is in contact with the driven-side clutch plate 6 and the two clutch plates 46 and 6 do not vary in the relative rotation angle (i.e., a state of no occurrence of slip), and thus the estimation is not performed in a state where slip occurs between the two clutch plates 46 and 6 (a state of so-called half-clutch).

In this manner, the controller A4 is able to estimate the torque output from the input gear G2 and the torque transmitted to the driven-side clutch plate 6, and therefore the power transmission device 1 does not need to be provided with the input-side torque sensor 5 and the output-side torque sensor 7.

Subsequently, the controller A4 proceeds to step ST2 to determine whether the state acquired in step ST1 is the abnormal state. If the state is determined to be abnormal, the control or the like of the motor A2 might not be able to be appropriately performed. Accordingly, the controller A4 proceeds to step ST3 to set the electric current or voltage supplied to the motor A2 and the characteristic modification unit 43 of the intermediate member 4 to zero. Here, the processing of step ST2 corresponds to the processing performed by "the first determination unit" in the present invention.

Thereby, the motor A2 stops the driving and the voltage applied to the characteristic modification unit 43 of the intermediate member 4 becomes zero, by which the clutches 6 and 46 are placed in the non-transmission state. Therefore, even if the torque is transmitted to the driven-side clutch plate 6 before the processing of step ST3 is performed, the clutches 6 and 46 are placed in the non-transmission state by performing the processing of step ST3. Specifically, the mechanical connection is closed, thereby causing a state where the torque output from the motor A2 is not transmitted to the output unit B side (that is, the transmission of the torque is mechanically disconnected). Therefore, it is possible to prevent the power transmission device 1 from performing an unexpected operation which is caused by unexpected values of the voltages supplied to the motor A2 and the intermediate member 4 due to a control or the like based on the information detected by a sensor which does not operate normally and therefore to improve the safety of the power transmission device 1. After the end of the processing of step ST3, this control processing terminates.

Here, the processing of step ST3 corresponds to "perform a control to achieve the non-transmission state in the case where the determination result of the first determination unit is negative" in the present invention.

If the state is determined to be normal in step ST2, the controller A4 proceeds to step ST4 to acquire a stiffness command value of the variable stiffness unit 41 of the intermediate member 4, which is decided by processing (not illustrated) of the controller A4. The stiffness command value of the variable stiffness unit 41 of the intermediate member 4 is a value for use in controlling the stiffness of the variable stiffness unit 41 of the intermediate member 4 to be the value concerned. The stiffness command value is appropriately decided by the controller A4 according to the operation of the power transmission device 1. For example, if a joint is required to be stiff such as a case of accurately driving the arm of the power transmission device 1, the controller A4 sets the stiffness command value to a large value in order to increase the stiffness of the power transmission device 1. In addition, if a joint is required to be flexible for the reason such as softening the effects of an unintended impact applied to the arm or the like of the power transmission device 1, the controller A4 sets the stiffness command value to a smaller value.

Upon the completion of the processing of step ST4, the controller A4 proceeds to steps ST5 and ST6. Specifically, in order to execute steps ST5 and ST6 in parallel, the controller A4 branches the thread, executes step ST5 (or ST6) in the branched thread, and executes step ST6 (or ST5) in the thread which has run before the branching. Thereby, steps ST5 and ST6 are executed in parallel.

In step ST5, the controller A4 decides a voltage applied to the characteristic modification unit 43 of the intermediate member 4 so that the stiffness of the variable stiffness unit 41 of the intermediate member 4 is equal to the stiffness command value. In this decision, the voltage applied to the characteristic modification unit 43 is decided by acquiring the voltage corresponding to the stiffness command value according to the "voltage-stiffness" map as illustrated in FIG. 2A. Upon the completion of the processing of step ST5, a control signal is output so that the voltage acquired in step ST5 is applied to the characteristic modification unit 43 of the intermediate member 4 and this control processing ends in the thread where the processing of step ST5 has been performed.

In step ST6, the controller A4 estimates the stiffness of the variable stiffness unit 41 of the intermediate member 4 and the viscosity coefficient of the variable viscosity coefficient unit 42. The controller A4 estimates the stiffness and the viscosity coefficient by acquiring the stiffness of the variable stiffness unit 41 and the viscosity coefficient of the variable viscosity coefficient unit 42 corresponding to the voltage applied to the characteristic modification unit 43 of the intermediate member 4 at the present time according to the "voltage-stiffness" map and the "voltage-viscosity coefficient" map as illustrated in FIGS. 2A and 2B.

Upon the completion of the processing of step ST6, the controller A4 proceeds to step ST7 to determine whether the clutches 6 and 46 are in the transmission state. In the driven-side clutch plate 6, a torque occurs due to the transmission state of the clutches 6 and 46. On the other hand, if the clutches 6 and 46 are in the non-transmission state, the torque transmitted to the drive-side clutch plate 46 is not transmitted to the driven-side clutch plate 6 and therefore the torque detected by the output-side torque sensor 7 is zero. In this situation, the output from the output-side torque sensor 7 might be a value greater than zero due to a measurement error or the like of the output-side torque sensor 7.

Therefore, in this step ST7, the controller A4 determines that the clutches 6 and 46 are in the transmission state if the torque detected by the output-side torque sensor 7 is greater than a predetermined value (the predetermined value is zero or a value greater than zero with consideration for the above error) and determines that the clutches 6 and 46 are in the non-transmission state if the torque is equal to or smaller than the predetermined value. The predetermined value is previously decided according to an experiment or the like and stored in the storage device of the controller A4. Here, the processing of step ST7 corresponds to "the second determination unit" in the present invention.

If it is determined that the clutches 6 and 46 are not connected to each other in step ST7, the controller A4 proceeds to step ST8 to perform a rotation follow-up control. In the rotation follow-up control, the motor A2 is controlled so that a difference between the rotation angle of the driven-side clutch plate 6 and the rotation angle of the drive-side clutch plate 46 is equal to or less than a predetermined value. This enables an immediate change to the transmission state at the time of a change of the clutches 6 and 46 from the non-transmission state to the transmission state.

Usually, when the clutches 6 and 46 are connected to each other, it is necessary to place the clutches 6 and 46 in the transmission state within a range of a difference in a relative displacement between the previously-defined driven element and driving element. By previously performing the above rotation follow-up control, the controller A4 is able to set the transmission state immediately after determining that the transmission state is to be made and by extension to reduce the time for the control processing.

The rotation follow-up control is performed, for example, in the case of restarting the driving of the output unit B after temporarily interrupting the driving of the output unit B for some reason during driving of the output unit B with the motor A2.

Here, the processing of step ST8 corresponds to "control the drive source so that a difference between a displacement of the driven element and a displacement of the driving element is equal to or less than a predetermined value in the case where the determination result of the first determination unit is affirmative and the determination result of the second determination unit is negative" in the present invention.

If it is determined that the clutches are connected to each other in step ST7, the controller A4 proceeds to step ST9 to perform a feedback torque control. Here, the feedback torque control is to control an output torque of the motor A2 so that the torque transmitted to the output unit B reaches a target torque decided by processing (not illustrated) of the controller A4.

Well-known various control processes are applicable to the feedback torque control. For example, Japanese Patent Application Laid-Open No. 2011-115878 describes a technique of controlling a driving element in the case where an elastic element is disposed between the driving element (the motor A2) and the driven element (the output unit B). In step ST9, for example, a control described in this gazette is performed.

Upon the completion of the processing of step ST8 or step ST9, the controller A4 ends this control processing.

Here, the processing of step ST9 corresponds to "control the motive power transmitted to the driven element in the case where the determination result of the first determination unit is affirmative and the determination result of the second determination unit is affirmative" in the present invention.

In addition, it is possible to determine whether the clutches 6 and 46 are in the transmission state from the voltage applied to the characteristic modification unit 43 of the intermediate member 4. The drive-side clutch plate 46, however, might not be in contact with the driven-side clutch plate 6 (in other words, the non-transmission state is set), even in the case where the voltage applied to the characteristic modification unit 43 of the intermediate member 4 is equal to or greater than the predetermined voltage V1, due to an individual difference in the intermediate member 4 or ambient surrounding (for example, temperature, etc.).

For such a case, if the voltage applied to the intermediate member 4 is equal to or greater than the predetermined voltage V1 when it is determined that the clutches 6 and 46 are not placed in the transmission state in the processing of step ST7, the predetermined voltage V1 may be corrected (hereinafter, this correction is referred to as "correction processing"). More specifically, in the correction processing, the controller A4 sets the voltage applied to the intermediate member 4 at the time when the clutches 6 and 46 shift from the non-transmission state to the transmission state to a new predetermined voltage V1.

As described above, the controller A4 controls the motor A2 and the intermediate member 4.

As described hereinabove, in the power transmission device 1 of the exemplary embodiment, the torque of the motor A2 is transmitted to the output unit B via the intermediate member 4. Specifically, the power transmission device 1 is provided with the variable viscosity coefficient unit 42 having viscosity as a power transmission element on the power transmission path between the motor A2 and the output unit B, thereby enabling the vibration of the output unit B to be mechanically converged at the time of controlling the output unit B. Moreover, the stiffness of the variable stiffness unit 41 is able to be modified by the control of the controller A4, thereby enabling the output unit B to be flexibly controlled as the situation demands.

Moreover, the controller A4 modifies the stiffness and the viscosity coefficient according to the voltage characteristics as illustrated in FIGS. 2A and 2B and therefore is able to make the damping rate of the vibration of the output unit B constant. This enables the controller A4 to easily predict the vibration of the output unit B in the control period at the present time from the vibration of the output unit B in the previous control period, which makes the control processing easy. In this manner, a power transmission element whose stiffness and viscosity coefficient are variable is used and the stiffness and the viscosity coefficient are appropriately modified, thereby enabling the oscillation of the controlled object to be effectively suppressed.

First Embodiment

Subsequently, specific embodiments of the power transmission device of the exemplary embodiment will be described. A first embodiment is described, first.

Figure 4:
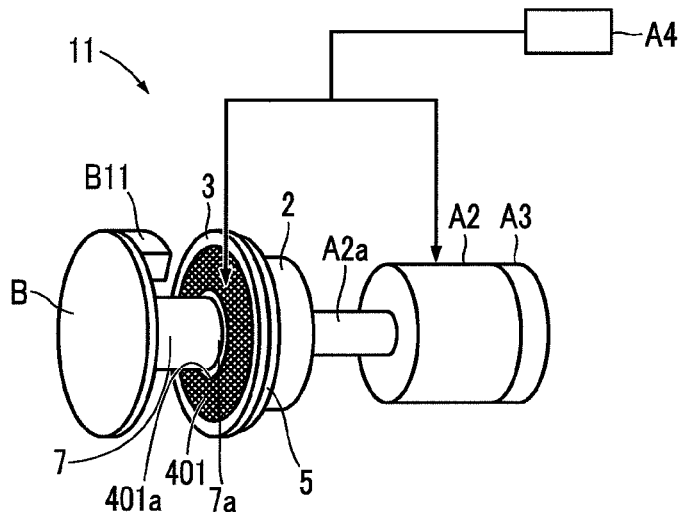
FIGS. 4A, 4B, and 4C are diagrams illustrating the power transmission device of a first embodiment.
Figure 4:
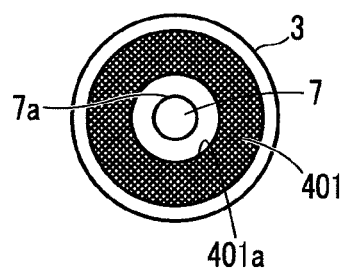
Figure 4:
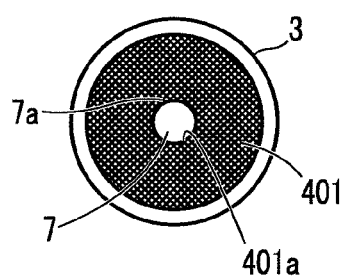

FIGS. 4A, 4B, and 4C are diagrams illustrating a power transmission device 11 of the first embodiment. The power transmission device 11 includes a motor A2, a controller A4, a speed reducer 2, an outer frame 3, an intermediate member 401, an input-side torque sensor 5, an output-side torque sensor 7, and an output unit B. The motor A2 is an electric motor which outputs a torque rotating a motor output shaft A2a by being supplied with electric power in the same manner as the description of the exemplary embodiment.

For the speed reducer 2, for example, a Harmonic Drive® or the like is used. In the speed reducer 2, there is disposed an input-side torque sensor 5 formed in a substantially columnar shape. The input-side torque sensor 5 is a torque sensor with a strain gauge. The input-side torque sensor 5 detects a torque which is output from the speed reducer 2 according to a strain of the input-side torque sensor 5 and outputs an electrical signal appropriate to the magnitude of the torque.

The input-side torque sensor 5 is connected to the outer frame 3. The outer frame 3 is formed in a substantially cylindrical shape, with a substantially cylindrical intermediate member 401 fixed to a hollow portion thereof. The intermediate member 401 may be formed in other shapes. For example, the shape may be a quadrangular prism or the like with a through-hole provided in the longitudinal direction (at this time, the outer frame 3 is formed in such a way that the inner wall of the outer frame 3 comes in contact with the outer wall of the intermediate member 401). In this specification, it is assumed that the "tubular shape" includes this kind of shape as well as a circular cylindrical shape.

The intermediate member 401 is formed so as to be reduced in the space of the hollow portion in a state where a voltage is applied. More specifically, as illustrated in FIGS. 4B and 4C, the hollow portion of the intermediate member 401 has a small diameter in a state where a voltage is applied by the control of the controller A4 (FIG. 4C), in comparison with a state where the voltage is not applied (FIG. 4B). Here, the controller A4 corresponds to "the voltage application unit" in the present invention.

The reduction in space of the hollow portion is achieved by forming the intermediate member 401 as exemplified in FIGS. 5A and 5B. FIG. 5A illustrates a state where the voltage is not applied to the intermediate member 401, and FIG. 5B illustrates a state where the voltage is applied to the intermediate member 401. As illustrated in FIG. 5A, the intermediate member 401 includes an anode P, a cathode M, and a conductive polymer actuator E. These are laid in the order of "the cathode M→the conductive polymer actuator E→the anode P" (hereinafter, this stacked structure is collectively referred to as "stack M, E, P"). If a potential difference occurs between the anode P and the cathode M, the stack M, E, P expands on the anode P side of the conductive polymer actuator E and contracts on the cathode M side of the conductive polymer actuator E.

The above stack M, E, P is formed so as to incline from the cathode M side toward the anode P side in a direction from the radial outside to the radial inside. Thereby, if a potential difference occurs between the anode P and the cathode M, the stack M, E, P contracts on the cathode M side and expands on the anode P side as illustrated in FIG. 5B, and therefore the inclination of the stack M, E, P becomes gentler (where the inclination angle is an angle between "the radial direction of the intermediate member 401" and "the direction perpendicular to the stacking direction of the stack M, E, P"). Thus, the diameter of the hollow portion of the stack M, E, P in FIG. 5B is smaller than the diameter (indicated by a broken line in FIG. 5B) of the hollow portion of the stack M, E, P in FIG. 5A.

At this time, as the potential difference between the anode P and the cathode M is greater, the inclination becomes gentler (the angle of the inclination becomes smaller). Additionally, as the inclination is gentler, the diameter of the hollow portion of the stack M, E, P (and by extension the intermediate member 401) becomes smaller.

Moreover, the conductive polymer actuator E varies in the stiffness and the viscosity coefficient by the application of a voltage. The conductive polymer actuator E used for the intermediate member 401 of the first embodiment has the characteristics of the stiffness and the viscosity coefficient to the voltage as illustrated in FIGS. 2A and 2B.

In the hollow portion of the intermediate member 401, an output-side torque sensor 7 formed in a substantially columnar shape is disposed. The output-side torque sensor 7, which is a torque sensor with a strain gauge in the same manner as the input-side torque sensor 5, detects a torque transmitted to the output-side torque sensor 7 according to the strain and outputs an electrical signal appropriate to the magnitude of the torque.

The output-side torque sensor 7 is formed in such a size that the wall surface (hereinafter, referred to as "output-side wall surface") 7a of the output-side torque sensor 7 does not come in contact with the wall surface (hereinafter, referred to as "intermediate member wall surface") 401a of the hollow portion of the intermediate member 401 when the voltage is not applied to the intermediate member 401 and is formed in such a size that the output-side wall surface 7a comes in contact with the intermediate member wall surface 401a when the voltage applied to the intermediate member 401 is equal to or greater than the predetermined voltage V1. In addition, the "intermediate member wall surface 4a" and the "output-side wall surface 7a" are formed so that a large frictional force occurs when these are in contact with each other.

Moreover, the output unit B to which a load is connected is fixed to the output-side torque sensor 7.

Due to the above configuration, the intermediate member wall surface 401a comes in contact with the output-side wall surface 7a when a voltage equal to or greater than the predetermined voltage V1 is applied to the intermediate member 401. Thereby, the torque output from the motor A2 is transmitted to the output unit B via the intermediate member 401. At this time, the motor A2, the intermediate member 401, and the output unit B rotate about the central axis common thereto. On the other hand, when no voltage is applied to the intermediate member 401 or a voltage less than the predetermined voltage V1 is applied to the intermediate member 401, the intermediate member wall surface 401a is not in contact with the output-side wall surface 7a and therefore the torque output from the motor A2 is not transmitted to the output unit B.

In this manner, whether the torque is transmitted to the output unit B is decided according to whether or not the voltage equal to or greater than the predetermined voltage V1 is applied to the intermediate member 401. Specifically, it is possible to consider that a clutch system is formed by the intermediate member wall surface 401a and the output-side wall surface 7a.

Here, the intermediate member 401 of the first embodiment corresponds to the intermediate member 4 of the exemplary embodiment, and the conductive polymer actuator E corresponds to the variable stiffness unit 41 and the variable viscosity coefficient unit 42 of the exemplary embodiment. In addition, the intermediate member wall surface 401a of the first embodiment corresponds to the drive-side clutch plate 46 of the exemplary embodiment. Moreover, the output-side wall surface 7a of the first embodiment corresponds to the driven-side clutch plate 6 of the exemplary embodiment.

Furthermore, in the output unit B, there is disposed an encoder B11 for use in detecting a rotation angle relative to the outer frame 3. Thereby, the encoder B11 detects a relative displacement (rotation angle) of the outer frame 3 relative to the output-side wall surface 7a (and by extension the output unit B). Accordingly, when the intermediate member wall surface 401a is in contact with the output-side wall surface 7a, the relative displacement therebetween is zero, and therefore the displacement detected by the encoder B11 indicates a displacement in the twist direction of the intermediate member 401 appropriate to the torque transmitted to the intermediate member 401. Here, the encoder B11 of the first embodiment corresponds to the displacement encoder B1 of the exemplary embodiment.

As described above, the power transmission device 1 of this embodiment uses the conductive polymer actuator as the intermediate member 401 and therefore is able to modify the stiffness and the viscosity coefficient thereof.

Second Embodiment

Figure 6:
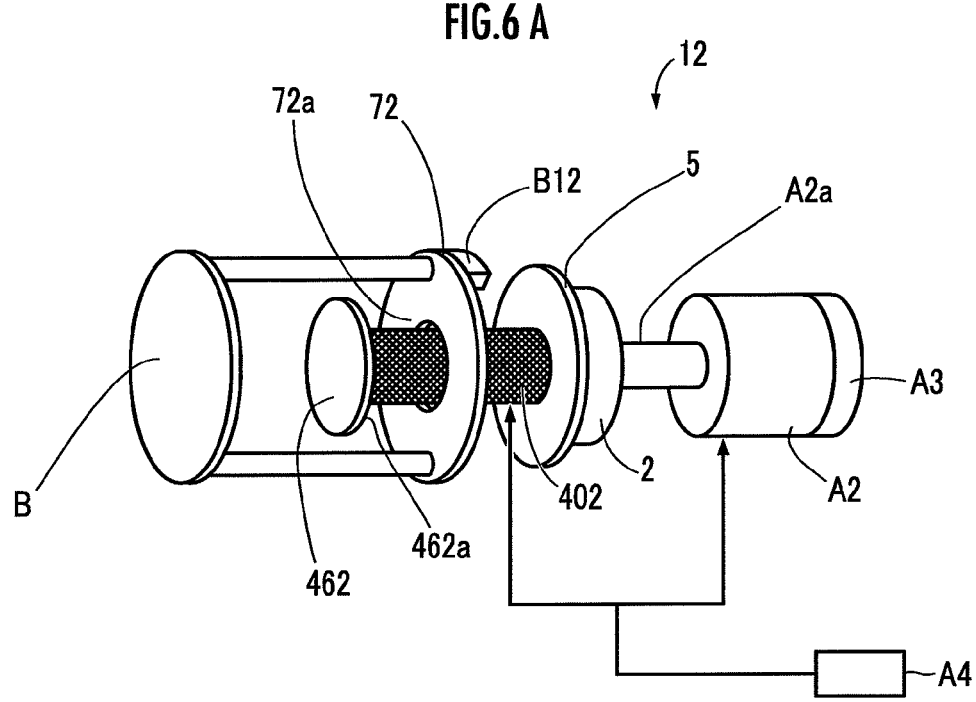
FIGS. 6A, 6B, and 6C are diagrams illustrating a power transmission device of a second embodiment.
Figure 6:
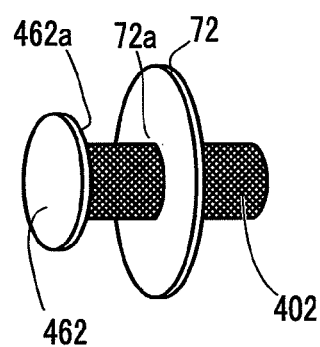
Figure 6:
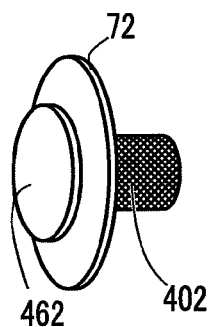

Subsequently, a power transmission device 12 of a second embodiment of the present invention will be described with reference to FIGS. 6A, 6B, and 6C. The power transmission device 12 of the second embodiment differs from the power transmission device 11 of the first embodiment in the configurations of the intermediate member and the output side. In this embodiment, as illustrated in FIGS. 6A, 6B, and 6C, an intermediate member 402 is composed of a conductive polymer actuator and is formed in a substantially columnar shape. Therefore, the conductive polymer actuator varies in the stiffness and the viscosity coefficient by the application of a voltage. The intermediate member 402 may be formed in, for example, a pillar or tubular shape or the like as well as a substantially columnar shape.

Moreover, an input-side clutch plate 462 which functions as a clutch plate is fixed to the left-hand columnar end portion of the intermediate member 402. The input-side clutch plate 462 is formed so as to have a diameter larger than the diameter of the intermediate member 402. Here, the input-side clutch plate 462 corresponds to the "convex portion" in the present invention.

Figure 7:
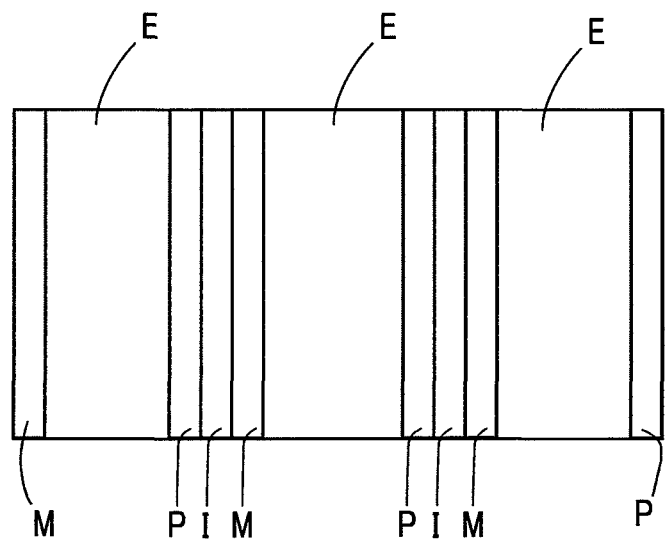
FIGS. 7A and 7B are diagrams illustrating the details of an intermediate member of the power transmission device of the second embodiment.
Figure 7:
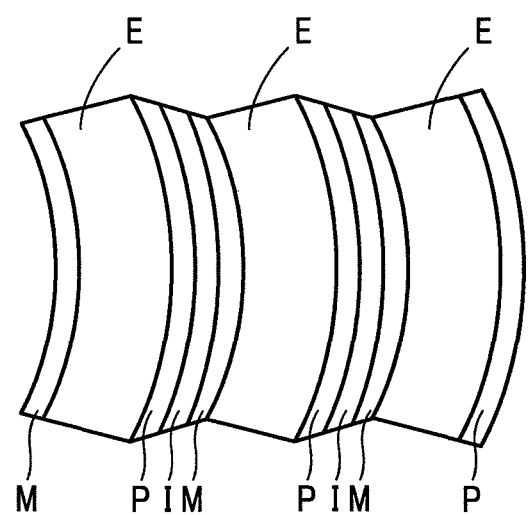

The intermediate member 402 is configured as exemplified in FIG. 7A. The intermediate member 402 is formed by stacking a plurality of stacks M, E, P each of which is composed of a cathode M, a conductive polymer actuator E, and an anode P laid in the order of "the cathode M→the conductive polymer actuator E→the anode P" via an insulating layer I. At this time, these are stacked along the columnar axial direction of the intermediate member 402. Thereby, in the case where a potential difference occurs between the cathode M and the anode P, the intermediate member 402 gets shorter in the stacking direction (axial direction) due to the expansion and contraction of the conductive polymer actuator E as exemplified in FIG. 7B, in comparison with the case where the potential difference between the cathode M and the anode P is zero. At this time, the intermediate member 402 gets shorter in the stacking direction (axial direction) as the potential difference increases.

Therefore, the intermediate member 402 expands and contracts in the stacking direction according to whether or not a voltage is applied as illustrated in FIGS. 6A, 6B, and 6C. FIG. 6B illustrates a state where the voltage is not applied to the intermediate member 402 and FIG. 6C illustrates a state where the voltage is applied to the intermediate member 402. As illustrated in these diagrams, the intermediate member 402 is configured so as to contract in the columnar axial direction (the horizontal direction of FIGS. 6A, 6B, and 6C) by the application of the voltage.

Moreover, the power transmission device 12 has an output-side torque sensor 72 in which a hole larger than the diameter of the intermediate member 402 is provided in the central portion. The intermediate member 402 is disposed in the hole of the output-side torque sensor 72. At this time, the input-side clutch plate 462 is disposed so as to be located to the left of the output-side torque sensor 72 in FIGS. 6A, 6B, and 6C. Further, an output unit B to which a load is connected is fixed to the output-side torque sensor 72.

Moreover, the surface of the input-side clutch plate 462, particularly a right-hand surface in FIGS. 6A, 6B, and 6C (hereinafter, referred to as "input-side clutch plate friction surface") 462a, and a surface of the output-side torque sensor 72, particularly a left-hand surface in FIGS. 6A, 6B, and 6C (hereinafter, referred to as "output-side friction surface") 72a, are configured so as to generate a large frictional force when these surfaces come in contact with each other. In other words, the output-side torque sensor 72 functions also as a driven-side clutch plate.

In addition, when a voltage equal to or greater than the predetermined voltage V1 is applied to the intermediate member 402, the intermediate member 402 contracts in the axial direction, by which the input-side clutch plate friction surface 462a comes in contact with the output-side friction surface 72a. Moreover, if the voltage applied to the intermediate member 402 is less than the predetermined voltage V1, the intermediate member 402 expands in the axial direction, by which the input-side clutch plate friction surface 462a separates from the output-side friction surface 72a.

Since the power transmission device 12 is configured as described above, it is possible to select whether to transmit the motive power of the motor A2 as a driving element to the output unit B as a driven element by adjusting the voltage applied to the intermediate member 402.

Here, the intermediate member 402 of the second embodiment corresponds to the intermediate member 4 of the exemplary embodiment and the conductive polymer actuator E corresponds to the variable stiffness unit 41 and the variable viscosity coefficient unit 42 of the exemplary embodiment. Further, the input-side clutch plate 462 of the second embodiment corresponds to the drive-side clutch plate 46 of the exemplary embodiment. Moreover, the output-side friction surface 72a of the second embodiment corresponds to the driven-side clutch plate 6 of the exemplary embodiment.

Furthermore, in the output-side torque sensor 72, there is disposed an encoder B12 for use in detecting a rotation angle relative to the input-side torque sensor 5. Thereby, the encoder B12 detects a relative displacement (rotation angle) of the input-side torque sensor 5 relative to the output-side torque sensor 72 (and by extension the output unit B). Accordingly, when the input-side clutch plate friction surface 462a is in contact with the output-side friction surface 72a, a relative displacement therebetween is zero. Therefore, the displacement detected by the encoder B12 indicates a displacement in a twist direction of the intermediate member 402 appropriate to the torque transmitted to the intermediate member 402. Here, the encoder B12 of the second embodiment corresponds to the displacement encoder B1 of the exemplary embodiment.

Third Embodiment

Figure 8:
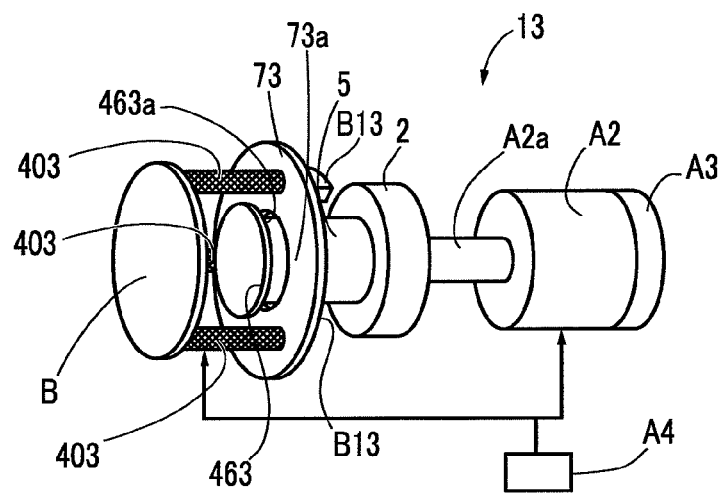
FIGS. 8A, 8B, and 8C are diagrams illustrating a power transmission device of a third embodiment.
Figure 8:
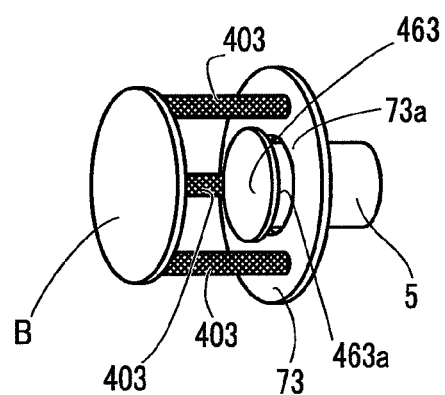
Figure 8:
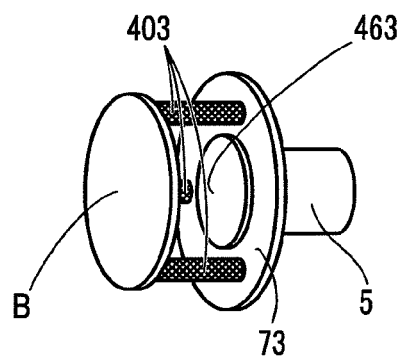

Subsequently, a power transmission device 13 of a third embodiment of the present invention will be described with reference to FIGS. 8A, 8B, and 8C. The power transmission device 13 of the third embodiment is the same in the configurations of a motor A2, a motor output shaft A2a, a motor encoder A3, and a speed reducer 2 as the power transmission device 12 of the second embodiment.

In the power transmission device 13 of the third embodiment, a columnar input-side torque sensor 5 is fixed to the speed reducer 2. Additionally, a disk-like input-side clutch plate 463 is fixed to an end portion opposite to the end portion to which the speed reducer 2 of the input-side torque sensor 5 is fixed. The input-side clutch plate 463 is formed so as to have a diameter larger than the diameter of the input-side torque sensor 5.

Moreover, the power transmission device 13 has a substantially cylindrical output-side torque sensor 73. The diameter of the hollow portion of the output-side torque sensor 73 is larger than the diameter of the input-side torque sensor 5 and smaller than the diameter of the input-side clutch plate 463. Then, the input-side torque sensor 5 is inserted and disposed into the hole of the output-side torque sensor 73. At this time, the input-side clutch plate 463 is disposed so as to be located to the left of the output-side torque sensor 73 in FIGS. 8A, 8B, and 8C.

Furthermore, one end of each of three intermediate members 403, which is formed in a substantially columnar shape, is fixed to the output-side torque sensor 73. The other end of each of the three intermediate members 403 is fixed to the output unit B to which a load is connected. Each of the three intermediate members 403 is configured so as to expand and contract in the axial direction when a voltage is applied in the same manner as the intermediate member 402 of the second embodiment. The number of intermediate members 403 may be any other number as well as three. In addition, the intermediate member 403 may be formed in other shapes such as other pillar or tubular shapes as well as the columnar shape.

Moreover, the surface of the input-side clutch plate 463, particularly a right-hand surface in FIGS. 8A, 8B, and 8C (hereinafter, referred to as "input-side clutch plate friction surface") 463a, and a surface of the output-side torque sensor 73, particularly a left-hand surface in FIGS. 8A, 8B, and 8C (hereinafter, referred to as "output-side friction surface") 73a, are configured so as to generate a large frictional force when these surfaces come in contact with each other. In other words, the output-side torque sensor 73 functions also as a driven-side clutch plate.

In addition, when a voltage equal to or greater than the predetermined voltage V1 is applied to the intermediate member 403, the intermediate member 403 contracts in the axial direction, by which the input-side clutch plate friction surface 463a comes in contact with the output-side friction surface 73a. Moreover, if the voltage applied to the intermediate member 403 is less than the predetermined voltage V1, the intermediate member 403 expands in the axial direction as illustrated in FIG. 8B, by which the input-side clutch plate friction surface 463a separates from the output-side friction surface 73a.

Since the power transmission device 13 is configured as described above, it is possible to select whether to transmit the motive power of the motor A2 as a driving element to the output unit B as a driven element by adjusting the voltage applied to the intermediate member 403.

Here, the intermediate member 403 of the third embodiment corresponds to the intermediate member 4 of the exemplary embodiment and the conductive polymer actuator E corresponds to the variable stiffness unit 41 and the variable viscosity coefficient unit 42 of the exemplary embodiment. Further, the input-side clutch plate 463 of the third embodiment corresponds to the drive-side clutch plate 46 of the exemplary embodiment. Moreover, the output-side friction surface 73a of the third embodiment corresponds to the driven-side clutch plate 6 of the exemplary embodiment.

Furthermore, in the output-side torque sensor 73, there is disposed an encoder B13 for use in detecting a rotation angle relative to the input-side torque sensor 5. Thereby, the encoder B13 detects a relative displacement (rotation angle) of the input-side torque sensor 5 relative to the output-side torque sensor 73 (and by extension the output unit B). Accordingly, when the input-side clutch plate friction surface 463a is in contact with the output-side friction surface 73a, a relative displacement therebetween is zero. Therefore, the displacement detected by the encoder B13 indicates a displacement in a twist direction of the intermediate member 403 appropriate to the torque transmitted to the intermediate member 403. Here, the encoder B13 of the third embodiment corresponds to the displacement encoder B1 of the exemplary embodiment.

Fourth Embodiment

Subsequently, a power transmission device 14 of a fourth embodiment of the present invention will be described with reference to FIGS. 9A, 9B, 10A, 10B, and 10C. The power transmission device 14 of the fourth embodiment is the same in the configurations of a motor A2, a motor output shaft A2a, a motor encoder A3, and a speed reducer 2 as the power transmission device 11 of the first embodiment.

Figure 9:
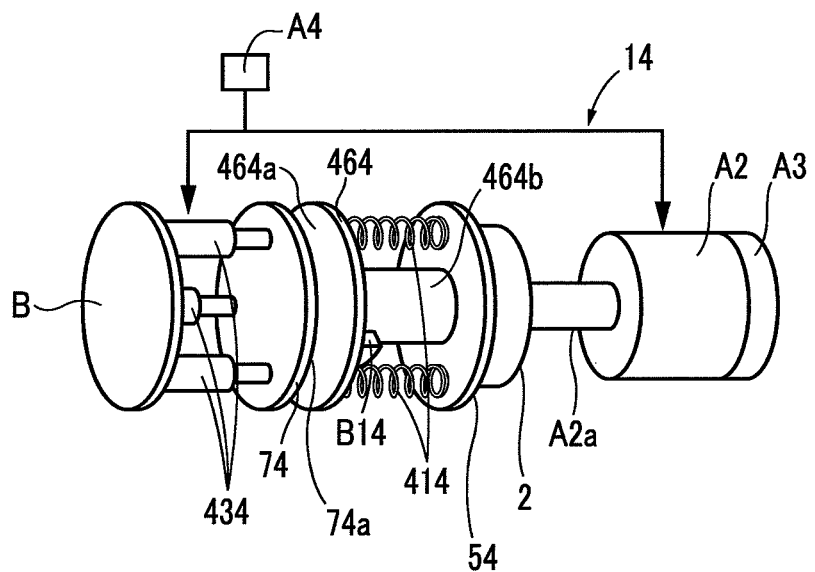
FIGS. 9A and 9B are diagrams illustrating a power transmission device of a fourth embodiment.
Figure 9:
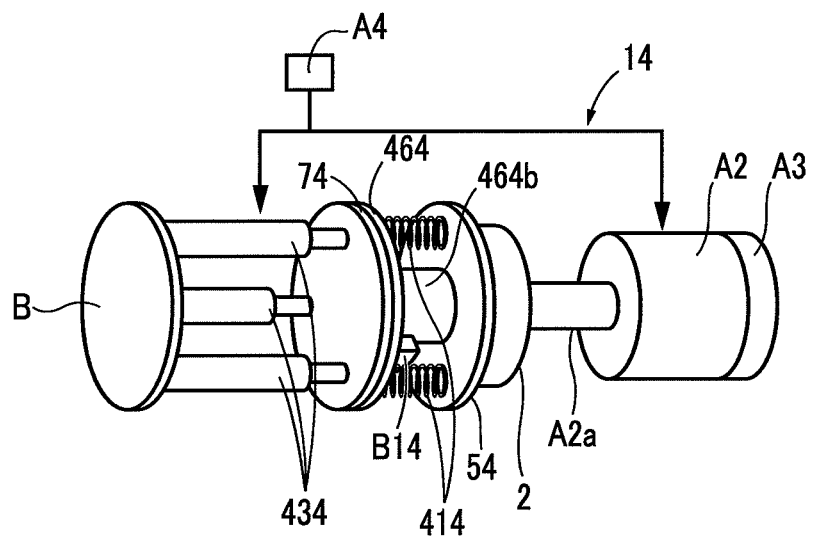
Figure 10:
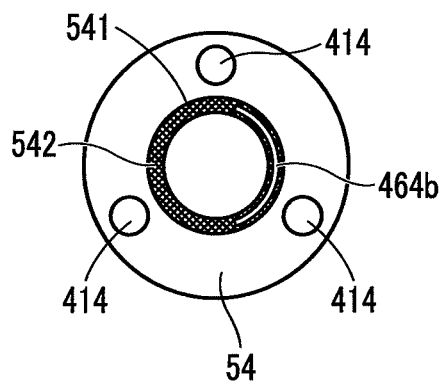
FIGS. 10A, 10B, and 10C are diagrams describing a method of varying a viscosity coefficient of the power transmission device of the fourth embodiment.
Figure 10:
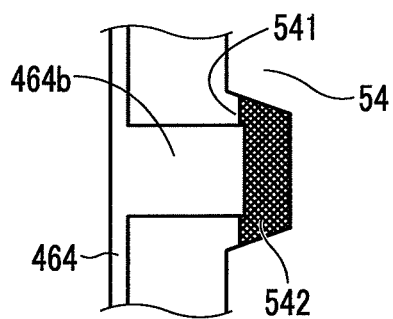
Figure 10:
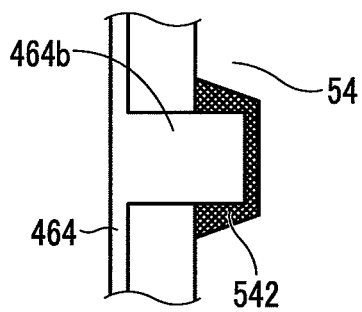

As illustrated in FIG. 9A, the input-side torque sensor 54 is formed in a substantially columnar shape. The speed reducer 2 is fixed to one end of the input-side torque sensor 54, and three nonlinear springs 414 are fixed to the other end of the input-side torque sensor 54. The number of the nonlinear springs 414 is not limited to three, but may be any other number. Furthermore, as illustrated in FIG. 10A, a concave portion 541, which has a circular shape when viewed along the normal line direction to the surface of the input-side torque sensor 54, is provided at the other end of the input-side torque sensor 54. In addition, the concave portion 541 is filled with grease 542 as a viscous liquid.

An input-side clutch plate 464 formed in a disk shape is fixed to an end portion opposite to the end portion to which the input-side torque sensor 54 of the three nonlinear springs 414 are connected. Further, a substantially columnar output-side torque sensor 74 is disposed in a state where an output-side friction surface 74a, which is one surface of the output-side torque sensor 74, faces the surface opposite to the surface to which the nonlinear springs 414 of the input-side clutch plate 464 are fixed (hereinafter, the surface is referred to as "input-side clutch plate friction surface") 464a. At this time, the input-side clutch plate friction surface 464a and the output-side friction surface 74a are disposed apart from each other.

One end of each of three piezoelectric elements 434, which is formed in a substantially pillar shape, is connected to the surface opposite to the output-side friction surface 74a of the output-side torque sensor 74. Moreover, the other end of each of the three piezoelectric elements 434 is connected to the output unit B. The number of the piezoelectric elements 434 is not limited to three, but may be any other number. In addition, the piezoelectric element may have any other various shapes such as a pillar or tubular shape or the like.

The piezoelectric element 434 has a piezoelectric body Z, which deforms when a voltage is applied thereto, with the piezoelectric body Z sandwiched between a cathode M and an anode P so as to be stacked. In the second and third embodiments, the stack M, E, P is formed in such a way that the conductive polymer actuator E is sandwiched between the cathode M and the anode P. In the fourth embodiment, however, there is used a stack M, Z, P in which the conductive polymer actuator E of the stack M, E, P is replaced with the piezoelectric body Z. Further, the piezoelectric element 434 is formed by stacking a plurality of stacks M, Z, P in the fourth embodiment, in the same manner as in the second and third embodiments.

The stack M, Z, P in the fourth embodiment configured as described above gets longer in the stacking direction since the piezoelectric body Z gets longer in the stacking direction when a potential difference occurs between the cathode M and the anode P. Therefore, the piezoelectric element 434 gets longer in the columnar axial direction of the piezoelectric element 434 (expands in the rightward direction of FIG. 9A and FIG. 9B) by applying a voltage to the piezoelectric element 434 (more specifically, by generating a potential difference between the cathode M and the anode P constituting the piezoelectric element 434). At this time, the piezoelectric element 434 gets longer as the potential difference increases.

The application of a voltage to the piezoelectric element 434 decreases the distance between the input-side clutch plate friction surface 464a and the output-side friction surface 74a, which have been disposed apart from each other. Then, when the voltage applied to the piezoelectric element 434 becomes equal to or greater than the predetermined voltage V1, the input-side clutch plate friction surface 464a comes in contact with the output-side friction surface 74a as illustrated in FIG. 9B. In this state, a transmission state is achieved in which the torque transmitted to the input-side clutch plate 464 is transmitted to the output-side torque sensor 74. Since the power transmission device 14 is configured as described above, it is possible to select whether to transmit the motive power of the motor A2 as a driving element to the output unit B as a driven element by adjusting the voltage applied to the piezoelectric element 434.

Moreover, if the voltage applied to the piezoelectric element 434 becomes greater than the predetermined voltage V1, the nonlinear spring 414 is biased in the rightward direction of FIG. 9A and FIG. 9B. Thereby, the stiffness of the nonlinear spring 414 increases. The nonlinear spring 414 used in the fourth embodiment is configured so as to vary in the stiffness in the twist direction (the rotational direction of the motor output shaft A2*a*) by being displaced in the pressing direction (the rightward direction of FIG. 9A and FIG. 9B). Therefore, the nonlinear spring 414 varies in the stiffness to the output torque of the motor A2 transmitted to the input-side torque sensor 54 by being biased by the piezoelectric element 434.

Moreover, on the surface opposite to the input-side clutch plate friction surface 464*a* of the input-side clutch plate 464, there is provided a convex portion 464*b* projecting toward the input-side torque sensor 54. The convex portion 464*b* is formed in an arc shape in which a part of the radial cross section of the cylindrical shape missing. The tip of the convex portion 464*b* is inserted into a concave portion 541.

The concave portion 541 is, as described above, formed in a circular shape when viewed along the normal line direction of the surface of the input-side torque sensor 54. In this condition, the central point of the circular shape of the concave portion 541 is identical with the central point of the rotating shaft of the input-side torque sensor 54. Thereby, even in the case of an occurrence of a change in the relative angle between the input-side torque sensor 54 and the input-side clutch plate 464, it is possible to prevent the concave portion 541 and the convex portion 464*b* from interfering with each other in the rotational direction.

The convex portion 464*b* does not need to have a shape with a part of the cylindrical shape missing, but may be formed in a "cylindrical shape (the radial cross section is ring-shaped)." Moreover, even in the case of an occurrence of a change in the relative angle between the input-side torque sensor 54 and the input-side clutch plate 464, the convex portion 464*b* may have any form unless the concave portion 541 and the convex portion 464*b* interfere with each other in movements in the rotational direction.

FIG. 10B illustrates a state where no voltage is applied to the piezoelectric element 434 and FIG. 10C illustrates a state where a voltage equal to or greater than the predetermined voltage V1 is applied to the piezoelectric element 434. As illustrated in FIG. 10B, a part of the side surface of the convex portion 464*b* is in contact with the grease 542. Therefore, in the case of an occurrence of a change in the relative rotation speed between the input-side torque sensor 54 and the input-side clutch plate 464, a viscous force to the rotational direction occurs according to the area of the contact.

The application of the voltage equal to or greater than the predetermined voltage V1 to the piezoelectric element 434 moves the convex portion 464*b* toward the bottom side of the concave portion 541 (in the rightward direction of FIG. 10C). This increases the contact area between the convex portion 464*b* and the grease 542. The increase in the contact area as described above increases the viscous force in comparison with the viscous force before the increase in the contact area. More specifically, if a voltage equal to or greater than the predetermined voltage V1 is applied to the piezoelectric element 434, the viscous force increases with an increase in the voltage.

As described hereinabove, the controller A4 is able to vary "the stiffness of the nonlinear spring 414" and "the viscosity coefficient between the convex portion 464*b* and the grease 542" according to the voltage applied to the piezoelectric element 434.

Here, the nonlinear spring 414 of the fourth embodiment corresponds to the variable stiffness unit 41 of the exemplary embodiment. The convex portion 464*b* and the grease 542 of the fourth embodiment correspond to the variable viscosity coefficient unit 42 of the exemplary embodiment. Moreover, the piezoelectric element 434 of the fourth embodiment corresponds to the characteristic modification unit 43 of the exemplary embodiment. Furthermore, the input-side clutch plate 464 of the fourth embodiment corresponds to the drive-side clutch plate 46 of the exemplary embodiment and to the third element of the present invention. Moreover, the input-side torque sensor corresponds to the fourth element of the present invention. Furthermore, the output-side friction surface 74*a* of the fourth embodiment corresponds to the driven-side clutch plate 6 of the exemplary embodiment.

Further, in the input-side clutch plate 464, there is disposed an encoder B14 for use in detecting a rotation angle relative to the input-side torque sensor 54. This causes the encoder B14 to detect a relative displacement (rotation angle) of the input-side torque sensor 54 relative to the input-side clutch plate 464. Therefore, the displacement detected by the encoder B14 indicates a displacement in the twist direction of the nonlinear spring 414. Here, the encoder B14 of the fourth embodiment corresponds to the displacement encoder B1 of the exemplary embodiment.

Although the convex portion 464*b* is provided in the input-side clutch plate 464 and the concave portion 541 is provided in the input-side torque sensor 54 in the fourth embodiment, the arrangement is not limited thereto. For example, the convex portion may be provided in the input-side torque sensor and the concave portion may be provided in the input-side clutch plate. In this case, the input-side clutch plate corresponds to the fourth element of the present invention and the input-side torque sensor corresponds to the third element of the present invention.

Moreover, in the fourth embodiment, the convex portion 464*b* and the concave portion 541 (the third element and the fourth element) are provided between the input-side clutch plate 464 and the motor A2 (closer to the driving element than the clutch system) and the piezoelectric element 434 (piezoelectric element) is provided between the output-side torque sensor 74 and the output unit B (closer to the driven element than the clutch system). The arrangement, however, is not limited thereto. For example, the third element and the fourth element may be provided in positions closer to the driven element than the clutch system and the piezoelectric element may be provided in a position closer to the driving element than the clutch system.

The conductive polymer actuator is slow to operate in comparison with the drive source of the motor such as an electric motor. Accordingly, it is difficult to use the conductive polymer actuator for a fast control. The conductive polymer actuator, however, has various advantages such as "a large generative force per unit weight or unit volume," "lightweight," "a simple drive structure which enables a reduction in size," "no driving sound due to operation on the molecular level (or, if any, the sound is not large enough to be noise)," and "able to be driven at a low voltage."

Therefore, as long as the conductive polymer actuator is used for a purpose in which the reaction rate of the conductive polymer actuator is permissible, the merit of using the conductive polymer actuator is large. For example, for a use in which switching is performed between the transmission state and the non-transmission state, such as a clutch, fast control of one [ms] or the like is unlikely to be a requirement.

Moreover, the conductive polymer actuator varies in the stiffness and the viscosity coefficient by the application of a voltage.

Therefore, the present inventor focuses attention on this point, and has arrived at a conclusion of using the conductive polymer actuator as a member whose stiffness and viscosity coefficient are varied and as a member which fulfills a clutch function, instead of as a drive source for use in moving the load, in the first to third embodiments. Thereby, it is possible to achieve a power transmission device which is advantageous in weight and size, in comparison with a power transmission device in which a conventional clutch system is disposed.

Moreover, since the conductive polymer actuator has variable stiffness and viscosity coefficient, the structure of the power transmission device is able to be simplified, with a less number of parts, thereby enabling a reduction in weight and size, in comparison with a power transmission device having a mechanism for use in varying the stiffness of the elastic member and a mechanism for use in varying the viscosity coefficient of the viscous member separately.

What is claimed is:

1. A power transmission device which transmits motive power transmitted from a driving element to a driven element, comprising:
    a first element having variable stiffness and configured to receive the motive power from the driving element and to transmit the motive power to the driven element;
    a second element having variable viscosity and configured to receive the motive power from the driving element and to transmit the motive power to the driven element;
    a first modification unit configured to modify the stiffness of the first element;
    a second modification unit configured to modify the viscosity of the second element;
    a drive source which transmits motive power to the driving element; and
    a control unit which controls the drive source and is configured to perform the control to modify the stiffness of the first element and the viscosity of the second element,
    wherein the first element and the second element are interposed between the driving element and the driven element,
    wherein the power transmission device is configured to be able to switch between a transmission state in which the motive power is transmitted to the driven element and a non-transmission state in which the transmission is disconnected by modifying the stiffness of the first element or the viscosity of the second element, and
    wherein the control unit includes:
    a first determination unit configured to determine whether the drive source is able to be normally controlled; and
    a second determination unit configured to determine whether the transmission state is set, wherein:
    the control unit performs a control to achieve the non-transmission state in a case where the determination result of the first determination unit is negative,
    the control unit controls the drive source so that a difference between a displacement of the driven element and a displacement of the driving element is equal to or less than a predetermined value in a case where the determination result of the first determination unit is affirmative and the determination result of the second determination unit is negative, and
    the control unit controls the motive power transmitted to the driven element in a case where the determination result of the first determination unit is affirmative and the determination result of the second determination unit is affirmative.

2. The power transmission device according to claim 1, wherein the first element and the second element each includes a conductive polymer actuator and the first modification unit and the second modification unit are each configured as a voltage application unit which applies a voltage to the conductive polymer actuator.

3. The power transmission device according to claim 1, wherein:
    the first element and the second element each include a conductive polymer actuator formed in a tubular shape;
    the first modification unit and the second modification unit are each configured as a voltage application unit which applies a voltage to the conductive polymer actuator;
    the driven element is at least partially disposed in a hollow portion of the conductive polymer actuator; and
    the conductive polymer actuator is configured in such a way that a space of the hollow portion decreases when a voltage is applied from the voltage application unit and that an inner wall surface of the hollow portion comes in contact with the driven element in a case where the applied voltage is equal to or greater than a predetermined voltage.

4. The power transmission device according to claim 1, wherein:
    the first element and the second element each include a conductive polymer actuator formed in a tubular or pillar shape;
    the first modification unit and the second modification unit are each configured as a voltage application unit which applies a voltage to the conductive polymer actuator;
    a convex portion is provided on an outer wall of the conductive polymer actuator; and
    the conductive polymer actuator is configured so as to contract in a longitudinal direction of the conductive polymer actuator when the voltage is applied from the voltage application unit and in such a way that the convex portion comes in contact with the driven element in a case where the applied voltage is equal to or greater than a predetermined voltage.

5. The power transmission device according to claim 1, wherein:
    the first element and the second element each include a conductive polymer actuator formed in a tubular or pillar shape;
    the first modification unit and the second modification unit are each configured as a voltage application unit which applies a voltage to the conductive polymer actuator;
    the driven element is connected to one end of the conductive polymer actuator; and
    the conductive polymer actuator is configured so as to contract in the longitudinal direction of the conductive polymer actuator when a voltage is applied from the voltage application unit and in such a way that the driven element comes in contact with the driving element in a case where the applied voltage is equal to or greater than a predetermined voltage.

6. The power transmission device according to claim 1, wherein:
    the first modification unit includes a first actuator;
    the first element is configured as a variable stiffness unit which varies in stiffness in a direction perpendicular to the driving direction by being at least partially pressed in response to driving of the first actuator;
    the second modification unit includes a second actuator; and
    the second element is configured as a variable viscosity coefficient unit which varies in viscosity in a direction perpendicular to the driving direction by being at least partially pressed by the driving of the second actuator.

7. The power transmission device according to claim 6, wherein:
    the first actuator and the second actuator are piezoelectric elements each formed in a tubular or pillar shape;
    the first element is a nonlinear spring;
    the second element includes a third element in which a convex portion is provided and a fourth element in which a concave portion along the shape of the convex portion is provided and filled with a viscous liquid;

motive power is transmitted from the driving element to one of the third element and the fourth element;

motive power is transmitted from the other of the third element and the fourth element to the driven element; and the second element is configured so that driving of the piezoelectric element increases an area in which the convex portion comes in contact with the viscous liquid.

8. A power transmission device which transmits motive power transmitted from a driving element to a driven element, comprising:

a first element having variable stiffness and configured to receive the motive power from the driving element and to transmit the motive power to the driven element;

a second element having variable viscosity and configured to receive the motive power from the driving element and to transmit the motive power to the driven element;

a first modification unit configured to modify the stiffness of the first element; and a second modification unit configured to modify the viscosity of the second element, wherein the second modification unit modifies the viscosity according to the stiffness modified by the first modification unit so that damping of vibration of the driven element is predetermined damping.

* * * * *